United States Patent
Woodall

(10) Patent No.: US 7,304,688 B1
(45) Date of Patent: Dec. 4, 2007

(54) ADAPTIVE Y/C SEPARATOR

(75) Inventor: Neil Woodall, Newport Beach, CA (US)

(73) Assignee: Pixelworks, Inc., Tualatin, OR (US)

( * ) Notice: Subject to any disclaimer, the term of this patent is extended or adjusted under 35 U.S.C. 154(b) by 429 days.

(21) Appl. No.: 10/833,979

(22) Filed: Apr. 27, 2004

Related U.S. Application Data

(60) Provisional application No. 60/472,280, filed on May 20, 2003.

(51) Int. Cl.
 *H04N 9/78* (2006.01)
(52) U.S. Cl. .................................... 348/663
(58) Field of Classification Search ................ 348/663, 348/665, 667, 668
 See application file for complete search history.

(56) References Cited

U.S. PATENT DOCUMENTS

| | | | |
|---|---|---|---|
| 4,443,821 A | 4/1984 | Kato | |
| 4,641,180 A * | 2/1987 | Richter | 348/669 |
| 4,675,724 A | 6/1987 | Wagner | |
| 4,855,815 A * | 8/1989 | Yasuki et al. | 348/668 |
| 5,097,321 A | 3/1992 | Stern et al. | |
| 5,121,203 A | 6/1992 | Citta | |
| 5,121,207 A | 6/1992 | Herrmann | |
| 5,134,467 A * | 7/1992 | Kim | 348/663 |
| 5,231,478 A * | 7/1993 | Fairhurst | 348/663 |
| 5,260,839 A | 11/1993 | Matsuta et al. | |
| 5,345,276 A * | 9/1994 | Hong | 348/663 |
| 5,355,176 A * | 10/1994 | Inagaki et al. | 348/609 |
| 5,359,366 A | 10/1994 | Ubukata et al. | |
| 5,367,338 A | 11/1994 | Rothermel et al. | |
| 5,394,193 A | 2/1995 | Kim | |
| 5,600,379 A | 2/1997 | Wagner | |
| 5,686,972 A * | 11/1997 | Kim | 348/663 |
| 5,909,255 A * | 6/1999 | Hatano | 348/663 |
| 5,990,978 A * | 11/1999 | Kim et al. | 348/663 |
| 6,175,389 B1 * | 1/2001 | Felts et al. | 348/663 |
| 6,300,985 B1 | 10/2001 | Lowe | |
| 6,462,790 B1 * | 10/2002 | Lowe et al. | 348/665 |
| 6,774,954 B1 | 8/2004 | Lee | |
| 6,795,126 B1 * | 9/2004 | Lee | 348/663 |
| 6,956,620 B2 * | 10/2005 | Na | 348/663 |

FOREIGN PATENT DOCUMENTS

| JP | EP 0449501 A | 10/1991 |
|---|---|---|
| JP | EP 0549375 A | 6/1993 |

* cited by examiner

*Primary Examiner*—Paulos Natnael
(74) *Attorney, Agent, or Firm*—Marger Johnson & McCollom, PC

(57) ABSTRACT

The present invention provides an apparatus and method for an adaptive Y/C separator that selects between input filters responsive to features of video signals. The adaptive Y/C separator can monitor the results of numerous filters and choose a combination of separators dependent upon signal properties. The adaptive Y/C separator can even blend results of the Y/C separators to improve signal quality.

21 Claims, 6 Drawing Sheets

ADAPTIVE Y/C SEPARATOR

This application claims priority from U.S. Provisional Application No. 60/472,280 filed May 20, 2003, which we incorporate by reference.

The present invention relates generally to a filter for a composite video signal, and particularly to a method and filter for separating luminance and chrominance signals in a composite video signal.

BACKGROUND OF THE INVENTION

Two predominant television standards for video signals are PAL (Phase Alternation by Line) and NTSC (National Television Systems Committee). Encoded according to one of these standards, color television broadcasts are typically transmitted as composite video signals that include a brightness signal (luminance, luma or Y) and a color signal (chrominance, chroma or C).

To produce the composite video signal, a modulated color signal (color sub-carrier) is added to the luminance signal prior to transmission. The chrominance signal occupies the same frequency spectrum as the high frequency luma signals, so color television receivers include an Y/C separator circuit for separating the composite video signal into its luminance and chrominance components. However, Y/C separators often permit crosstalk from the luminance into the chrominance (cross color) and of chrominance into luminance (cross luminance). Y/C crosstalk generally degrades the quality of displayed video pictures.

Many techniques for separating composite video signals into luminance and chrominance components exist. For instance, a band-pass filter used in conjunction with a notch or comb filter can separate the chrominance component from a composite signal. However, in addition to passing the chrominance signal, a notch/band-pass filter will pass high frequency luminance energy in the chrominance pass band. Therefore, some luminance appears as cross-color in a displayed picture. For instance, a vertical striped pattern on a displayed article of clothing can have a spatial frequency creating a high frequency luminance component, which appears as cross-color in a separated chrominance signal. This cross-color usually appears in a video picture as a colored rainbow superimposed on the reduced-amplitude striped pattern.

Although the notch/band-pass filter combination has drawbacks, it is useful under certain conditions. For example, the filter combination is effective in picture regions lacking high luminance frequencies in the horizontal direction while containing high frequency chroma information in the vertical direction. In these regions, the comb filter described below degrades pictures with cross luma.

Comb filtering is another technique for Y/C separation. Comb filtering usually provides a considerably better component separation compared to the above-described notch/band-pass filter combination. Although conventional comb filters provide improved separation, crosstalk between the chrominance and luminance still occurs. Comb filters are therefore most effective in pictures having a flat field of color or high luminance frequencies in the horizontal direction. However, when spatial discontinuities in the vertical direction occur in a video picture, a conventional comb filter may inadequately separate chrominance and luminance components, causing undesirable artifacts in the displayed picture.

Accordingly, there exists a need for an improved filter for separating the chrominance and luminance components of a composite video signal.

BRIEF DESCRIPTION OF THE DRAWINGS

These and other objects, features, and advantages of the present invention will be readily understood with reference to the following detailed description in conjunction with the accompanying drawings, where reference numerals correspond to structural elements.

DETAILED DESCRIPTION OF THE INVENTION

Figure 1:
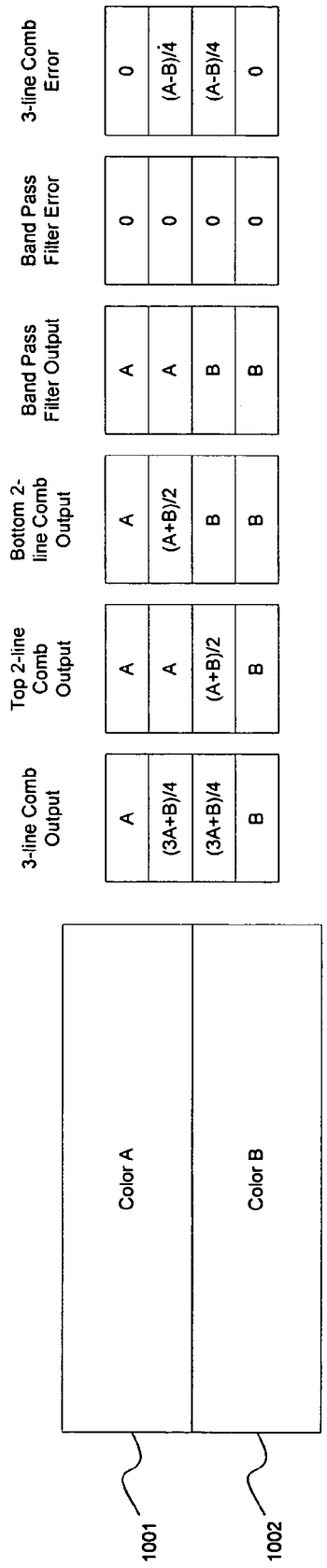
FIG. 1 is a diagram representing outputs of different filters for a vertical transition.

For convenience, like numerals in the description refer to like structures in the drawings. The invention described herein provides a system and method to adaptively separate Y and C signals, advantageously matching the strength of various Y/C separations with the corresponding signal characteristics.

Adaptive Y/C separation improves video signal quality. As discussed above, prior art notch/band-pass filters are each inadequate under certain video signal characteristics. Changes in video signals therefore occasionally present separators with the very conditions each separator is ill equipped for, causing undesirable artifacts in the displayed picture. Therefore video signal quality will improve by using an adaptive Y/C separator to adapt Y/C separation to signal features. For example, in picture regions lacking high luminance frequencies in the horizontal direction while containing high frequency chroma information in the vertical direction, adaptive Y/C separation may advantageously use a notch/band-pass filter combination, while in regions with a flat field of color adaptive Y/C separation may use better-suited comb filters.

In general, any feature of a video or other signal may be detected and used in an adaptive filter to determine a favorable filter configuration. For example, a plurality of Y/C separators may be coupled with a filter to select a subset of the separators in response to a video signal. The filter may then select separators to match filter advantages with features in the video signal. Furthermore, adaptive Y/C separation may combine the results of different separators or filters in order to improve displayed pictures.

Figure 3:
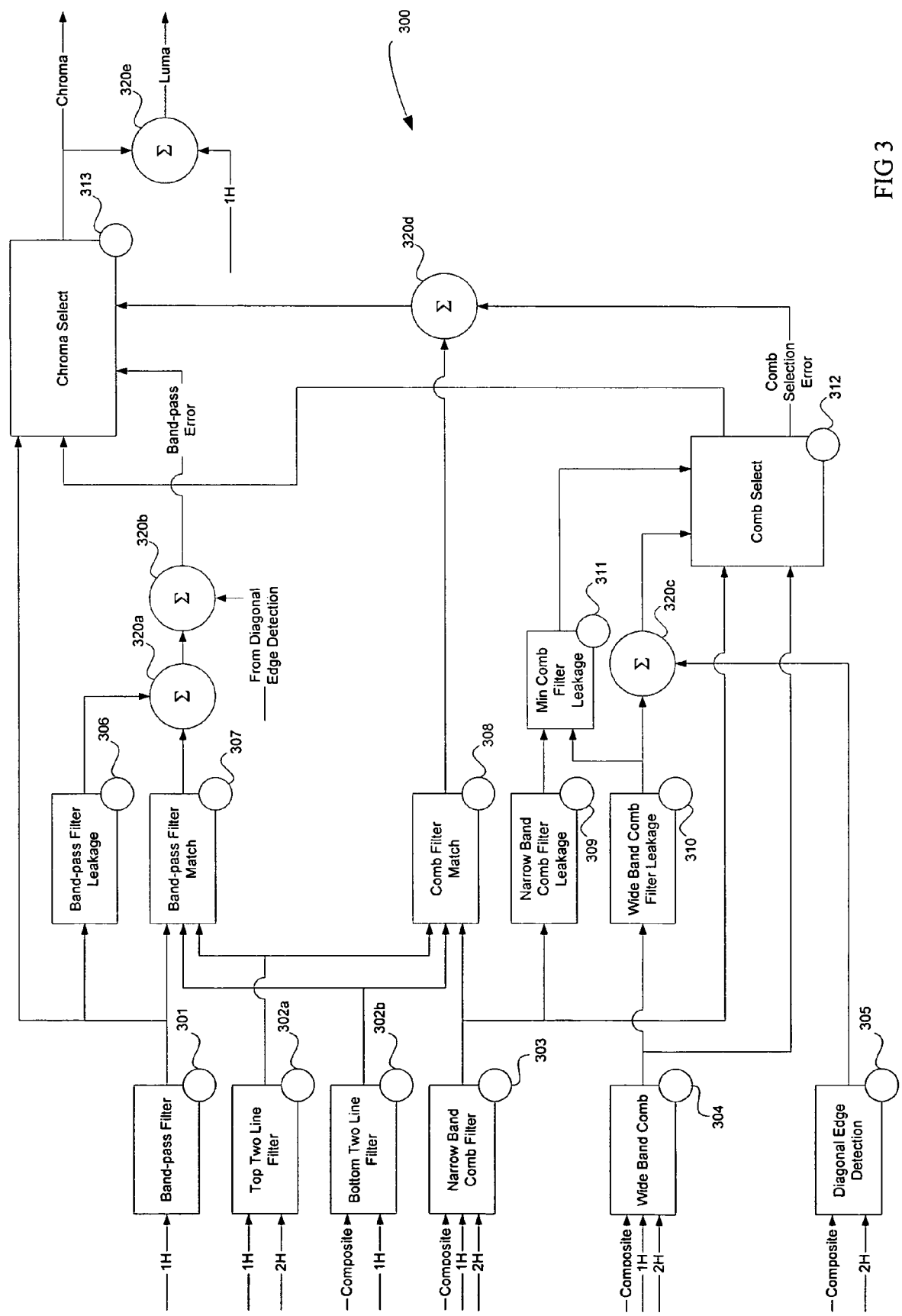
FIG. 3 is block diagram of an Y/C separator adaptive to characteristics of a video signal.

Referring now to FIG. 3, numeral 300 illustrates a block diagram of an adaptive Y/C separator in accordance with an embodiment of the present invention. Other configurations may benefit from the present invention.

The adaptive Y/C separator 300 includes a plurality of filters including a band-pass filter 301, a top two-line filter 302a, a bottom two-line filter 302b, a narrow band comb filter 303 and a wide band comb filter 304 that filter a plurality of input signals, as we explain in more detail below. The filters separate the Y and C components from the input video signals and thus, are also termed Y/C separators. The filters may filter any number of lines of input video signals. The adaptive Y/C separator 300 further includes a diagonal edge detector 305 to detect a diagonal edge between composite video signal and a signal delayed two horizontal lines (2H).

The Y/C separator 300 includes a band-pass filter leakage block 306, a narrowband comb filter leakage block 309, and a wide band comb filter leakage block 310. The leakage blocks 306, 309 and 310 calculate any energy outside of the sub-carrier frequency band. Put differently, blocks 306, 309 and 310 detect the presence of horizontal transitions (leakage). The band pass filter leakage block 306 filters the output of the band pass filter 301. The narrow band filter leakage block 309 filters the output of the narrow band comb filter 303. The wide band filter leakage block 310 filters the output of the wide band comb filter 304. A minimum comb filter leakage block 311 picks a minimum amount of leakage between the outputs of the narrow band comb filter leakage 309 and the wide band comb filter leakage 310. The output of the minimum comb filter leakage 311 reflects a relative mixture of the two comb filter inputs. To improve results, the minimum comb filter leakage block 311 adds a fraction of wideband comb filter leakage (error). The added fraction of wideband comb filter leakage helps because horizontal luma edges typically occur at the same location as horizontal chroma edges (for which the notch/band pass filter is the best match) and the horizontal luma edge causes a large amount of leakage in the wideband comb filter 304. Biasing the error upwards helps to bias the band-pass vs. comb filter decision towards a band-pass filter and preserve the horizontal edge.

The adaptive Y/C separator 300 additionally includes a band-pass filter match block 307 that compares the outputs of the band pass filter 301, top two line filter 302a, and bottom two line filter 302b. A comb filter match block 308 compares the outputs of the top two line filter 302a, bottom two line filter 302b, and narrow band comb filter 303.

A comb selector 312 produces a chroma output (subsequently provided to the chroma selector 313) based on outputs from comb filters 303 and 304 responsive to the outputs of the summation block 320c and the minimum comb filter leakage 311. A chroma selector 313 produces the Chroma signal responsive to the output of comb select block 312, the output of the band-pass filter 301, and the band pass and comb selection error signals, the comb selection error signal being summed at summation block 320d with the output to of the comb filter match block 308 to produce comb filter error signal. And summation block 320e generates the Luma signal by summing the Chroma signal to the 1H signal. Additionally, the chroma selector 313 may provide a signal for downstream processing that indicates the filters selected for chroma signal generation.

In the present embodiment, the filters 301, 302a, 302b, 303, and 304 receive a signal delayed one horizontal line (1H), two horizontal lines (2H), and composite inputs. A one-line delay can either be equal to the average line length or a multiple of the color sub carrier period. The latter delay will give better Y/C separation, but the choice is typically driven by the decoder's overall design so that it is a constant number of samples. In an embodiment, a delay line or any other circuitry capable of delaying the video signal, e.g., a logic circuit, may generate the 1H and 2H signals. More specifically, the band-pass filter 301 receives the 1H signal as an input. The band-pass filter 301 outputs the signal to band-pass filter leakage 306, band pass filter match 307, and chroma select 313. The top two-line filter 302a receives as inputs 1H signal and 2H signal. The filtered outputs of top two-line filter 302a are input to band-pass filter match 307 and comb filter match 308. The bottom two-line filter 302b receives as inputs the 1H and composite signals. The filtered outputs of bottom two-line filter 302b are input to band-pass filter match 307 and comb filter match 308.

Furthermore, the narrow band comb filter 303 receives composite, 1H and 2H signals as inputs. The filtered outputs of narrow band comb filter 303 are input to comb filter match 308, narrow band comb filter leakage 309, and comb select 312. The next Y/C separator, wide band comb filter 304, receives composite, 1H and 2H signals as inputs. Wide band comb filter 304 then filters the signals for output to wide band comb filter leakage block 310 and comb select block 312.

In the present example, the diagonal edge detector 305 receives a composite and a 2H signal, filters them, and sends the filtered result to the summation block 320c. The summation block 320c sums the output of the wide band comb filter leakage 310 with the output of the diagonal edge detector 305.

A summation block 320a sums the outputs of the band pass filter leakage block 306 and the band pass filter 307. A summation block 320b generates a band pass error signal by summing the outputs of the summation block 320a with the output of the diagonal edge detector 305. Summing the output of block 312 with the output of block 308 produces a final comb filter error signal.

The selection between the two comb filters is based on which filter has the lowest error signal. The error signal for the narrowband comb filter is simply the leakage found above (represented by blocks 306, 309, and 310). For the wideband comb filter 304, it is the leakage plus the diagonal edge detector 305 output. The chroma output can be a binary selection or some blending based on the size of the error signals. In the latter case, the result is a comb filter bandwidth that changes on a pixel-by-pixel basis. To improve results, increase narrowband comb filter error by adding a fraction of wideband comb filter leakage (error) as shown in minimum comb filter leakage block 311. The added fraction of wideband comb filter leakage helps because horizontal luma edges occurring at the same location as horizontal chroma edges cause a large amount of leakage in the wideband comb filter 304. Biasing the error upwards helps to bias the band-pass vs. comb filter decision towards a band-pass filter and preserve the horizontal edge.

Generally, as shown in the present embodiment in FIG. 3, the filters 301-304 may operate over 1, 2 and 3 lines of video. In an alternate PAL implementation, the filters 301-304 may operate over 1, 3 and 5 lines of video. The outputs of filters 301-304 are then compared to each other to detect vertical transitions in the chroma signal. To detect horizontal transitions in the chroma signal, Y/C separator 300 subtracts a sub carrier frequency from the output of the different filters and compares the magnitude of the resultant signals to each other. Finally, a diagonal edge detection algorithm 305 may bias the decision towards narrow bandwidth comb filter 303 because of its ability to preserve edges.

Detection of vertical transitions is possible, e.g., by comparing two line filters, 302a and 302b, to one line band-pass filter 301 and three-line narrow bandwidth comb filter 303. Two-line filters 302a and 302b represent an average of the chroma signal over two lines above or below the middle line. One line band pass filter 301 represents the middle line chroma signal. The narrow band comb filter (e.g., a three line filter) 303 represents the average chroma signal over three lines.

With no vertical transition, the outputs of the two line filter 302a and 302b, should equal the output of 3-line Y/C separator 303. If there is a transition then one of the two line filters 302a and 302b should be close to the one line band pass filter 301.

FIG. 1 shows different filters' outputs for a vertical transition. The errors shown represent a minimum difference between two 2-line comb filters 302a and 302b and bandpass 301 and 3-line comb filter 303. On either side of the transition, band-pass filter 301 has a smaller error than 3-line comb filter 303. More particularly, consider the case where Color A (block 1001) abruptly transitions to Color B (1002), as shown in FIG. 1. The 3-line comb filter 303 outputs the color sequence A, (3A+B)/4 approaching the transition between 1001 and 1002, and outputs the color sequence (3A+B)/4 leaving the transition. Over the same transition, the top 2-line comb filter 302a outputs the color sequence A, A approaching the transition, and outputs the color sequence (A+B)/2, B leaving the transition. The bottom 2-line comb filter 302b outputs the color sequence A, (A+B)/2 approaching the transition, and outputs the color sequence B, B leaving the transition. Over the same transition the band pass filter outputs the color sequence A, A, B, B. Therefore the error, as explained above, is 0, 0, 0, 0 over the transition for the band pass filter and 0, (A−B)/4, (A−B)/4, 0 for the 3-line comb filter. If there were no other features in the signal, then use of band-pass filter 301 favorably preserves the vertical chroma transition.

For a 3-line NTSC or 5-line PAL comb filter, two line filters 302a and 302b may be narrow bandwidth comb filters such that the average of the two filters equals a 3-line comb filter.

For a 3-line PAL comb filter, two line filters 302a and 302b may use a PAL modifier. A PAL modifier may add or subtract a 90-degree phase shift to the composite or 2H input so the same 2-line comb filter used in the NTSC version can be applied. Unfortunately, the PAL modifier also affects high frequency luma signals so the output represents an average of a true 2-line comb filter and a notch filter. To compensate for the corrupted 2 line filter, a 2-line to 3-line NTSC comparison is replaced with a comparison made between the average of the 3-line comb filter and band-pass filter 301 and the average of the top and bottom 2 line filters 302a and 302b.

To detect horizontal chroma transitions the decision logic looks at the energy in the chroma signal outside of the color sub-carrier frequency band. To preserve the transition it is desirable to pick the filter with the widest bandwidth, or pick the filter with the least amount of change in its output. Picking the least amount of change works as it prefers to pick the wider bandwidth filter before and after the transition while in the middle of the transition the bandwidth will have little impact.

Figure 2:
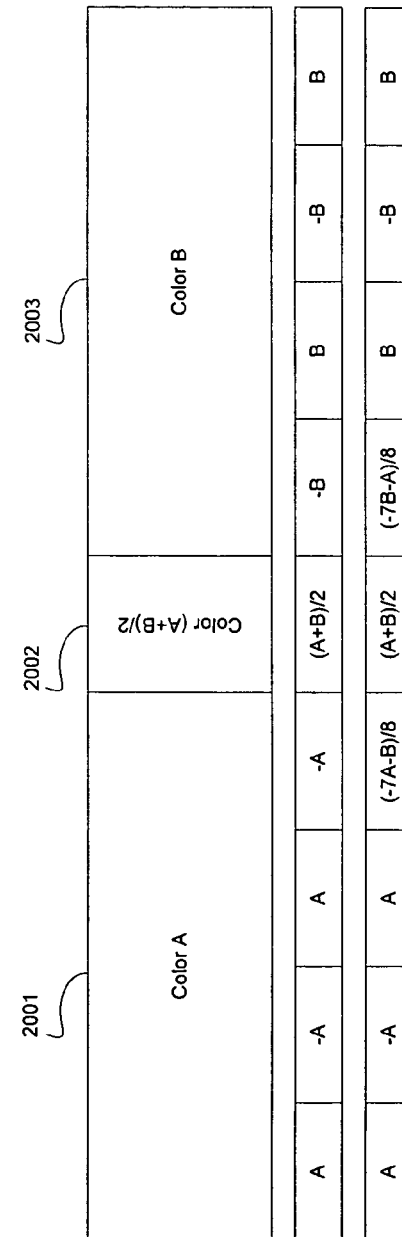
FIG. 2 is a diagram representing outputs of different filters for a horizontal transition.
Figure 2:
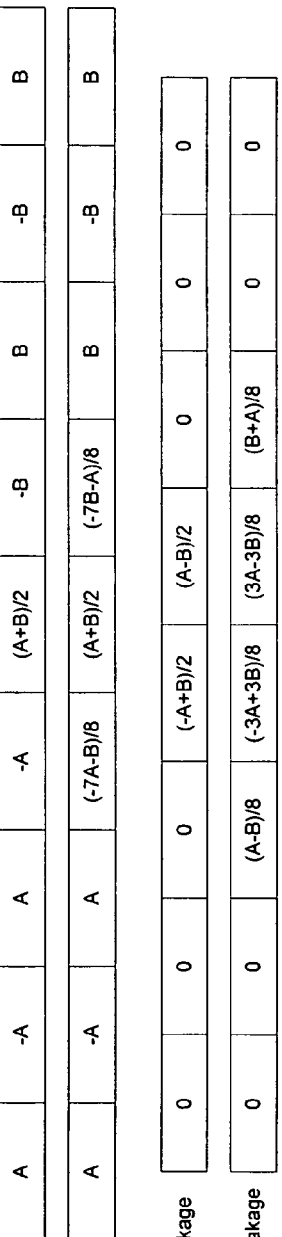

Referring now to FIG. 2, narrow bandwidth comb filter 303 spreads out a transition while the wide bandwidth comb filter 304 preserves the edge of the transition. More particularly, Color A (block 2001) transitions to Color B (block 2003) through a horizontal transition Color (A+B)/2 (block 2002). The wide bandwidth comb filter 304 outputs the color sequence A, −A, A, −A as it approaches the transition 2002. At the transition 2002, the wide bandwidth comb filter 304 outputs (A+B)/2. After the transition 2002, the wide bandwidth comb filter 304 outputs the color sequence −B, B, −B, and B. Over the same transition, narrow bandwidth comb filter 303 outputs the color sequence A, −A, A, (−7A−B)/8 as it approaches transition 2002. At the transition 2002, the narrow bandwidth comb filter 303 outputs (A+B)/2. After the transition 2002, the narrow bandwidth comb filter outputs the color sequence (−7B−A)/8, B, −B, B.

In FIG. 2, the transition is also spread out in the narrow bandwidth comb filter leakage 309 in comparison with the wide bandwidth comb filter leakage 310. More particularly, the wide bandwidth comb filter leakage 310 is the color sequence 0, 0, 0, (−A+B)/2 as it enters the transition 2002. Leaving the transition 2002, the wide bandwidth comb filter leakage 310 is the color sequence (A−B)/2, 0, 0, and 0. Over the same transition, narrow bandwidth comb filter leakage 309 is the color sequence 0, 0, (A−B)/8, (−3A+3B)/8 as it enters transition 2002. Leaving the transition 2002, the narrow bandwidth comb filter leakage 309 is the color sequence (3A−3B)/8, (B+A)/8, 0, 0. Therefore, in rejecting the chroma sub carrier, the residual signal is greater for the narrow bandwidth comb filter 303 at the beginning and end of the transition while it is slightly smaller in the middle. In one embodiment, the wide bandwidth comb filter leakage 310 is divided by two, in which case the wide bandwidth comb filter 304 always has the smallest leakage.

Referring back to FIG. 3, we now illustrate example filters in more detail. The band-pass filter of block 301 may be represented by a finite impulse response filter (FIR) with the following coefficients:

[−1, 0, 0, 0, 2, 0, 0, 0, −1]/4

These coefficients are not required to the overall design of the filter. For example, one implementation of the PAL version of the circuit uses a longer FIR filter to reduce cross-color without changing any decision logic.

[1, 0, 0, 0, −4, 0, 0, 0, 6, 0, 0, 0, −4, 0, 0, 0, 1]/16

The wide bandwidth comb filter, block 304, may use the following convolution kernel:

$$\begin{bmatrix} -1 \\ +2 \\ -1 \end{bmatrix} * 1/4$$

Again, the exact coefficients are not important to the overall design of the filter. For example, one 3-Line PAL implementation of the circuit may use the following convolution kernel:

$$\begin{bmatrix} +1, 0, 0, 0, & -2, 0, 0, 0, & +1 \\ -2, 0, 0, 0, & +4, 0, 0, 0, & -2 \\ +1, 0, 0, 0, & -2, 0, 0, 0, & +1 \end{bmatrix} * 1/8$$

The narrow bandwidth comb filter 303 may use the following convolution kernel:

$$\begin{bmatrix} +1, 0, 0, 0, & -2, 0, 0, 0, & +1 \\ -2, 0, 0, 0, & +4, 0, 0, 0, & -2 \\ +1, 0, 0, 0, & -2, 0, 0, 0, & +1 \end{bmatrix} * 1/6$$

As above, the exact type of filter is unimportant and a 3-Line PAL implementation may use the following:

$$\begin{bmatrix} -1,0,0,0, & +4,0,0,0, & -06,0,0,0, & +4,0,0,0, & -1 \\ +2,0,0,0, & -8,0,0,0, & +12,0,0,0, & -8,0,0,0, & +2 \\ -1,0,0,0, & +4,0,0,0, & -06,0,0,0, & +4,0,0,0, & -1 \end{bmatrix} * 1/32$$

The two 2-line Y/C separators, blocks 302a and 302b, use slightly different filters depending on whether the overall filter is an NTSC/5-line PAL or a 3-Line PAL design. For the NTSC case, the 2-line comb filters may be constructed by first applying the band-pass filter described for block 301 to each of the inputs. The output of the band-pass filters are then processed by the following filters:

Top 2-line comb filter 302a may be:

$$\begin{bmatrix} -1 \\ +1 \\ 0 \end{bmatrix} * 1/2$$

Bottom 2-line comb filter 302b may be:

$$\begin{bmatrix} 0 \\ +1 \\ -1 \end{bmatrix} * 1/2$$

For the 3-line PAL filter case, the filter is slightly more complex in order to shift the phase of the top and bottom lines by 90 degrees:

$$\begin{bmatrix} -/+1, 0, 0, 0, +/-1 \\ 0, 0, +2, 0, 0 \\ 0, 0, 0, 0, 0 \end{bmatrix} * 1/4$$

The bottom 2-line Y/C separator may have a similar modification. The +/−90 degree shift caused by the filter may be controlled based on whether the sample will be decoded to a U or a V sample and whether or not the V sample has been inverted (as determined by the PAL switch generated elsewhere in the video decoder).

Figure 4:
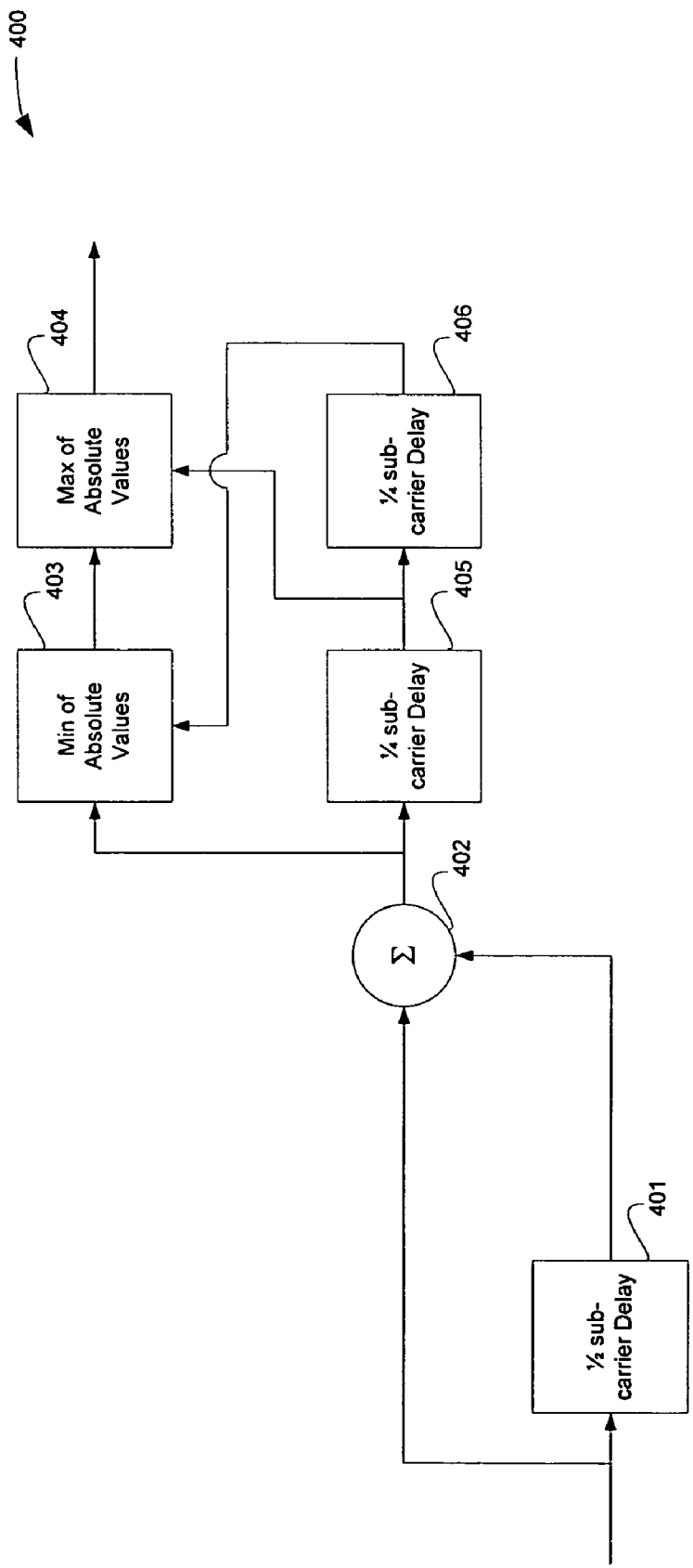
FIG. 4 is a block diagram representing a notch filter to average one input with the input delayed by ½ a sub carrier.

The detection of horizontal transitions is done with the leakage filters in blocks 306, 309 and 310. The leakage filters may consist of a notch filter to remove the sub carrier frequency followed by a minimum/maximum function, as shown in more detail in FIG. 4. FIG. 4 shows a notch filter implemented as the average of the input and the input delayed by ½ the sub carrier period. The minimum of the absolute values 403 of the output of averager 402 and the same signal delayed by ½ sub carrier period is taken. The maximum 404 of the minimum function and the absolute value of the averager output delayed by ¼ the sub carrier period is then taken, creating an output representing the peaks of the leakage without spreading the envelope out too far from a region of interest.

Figure 5:
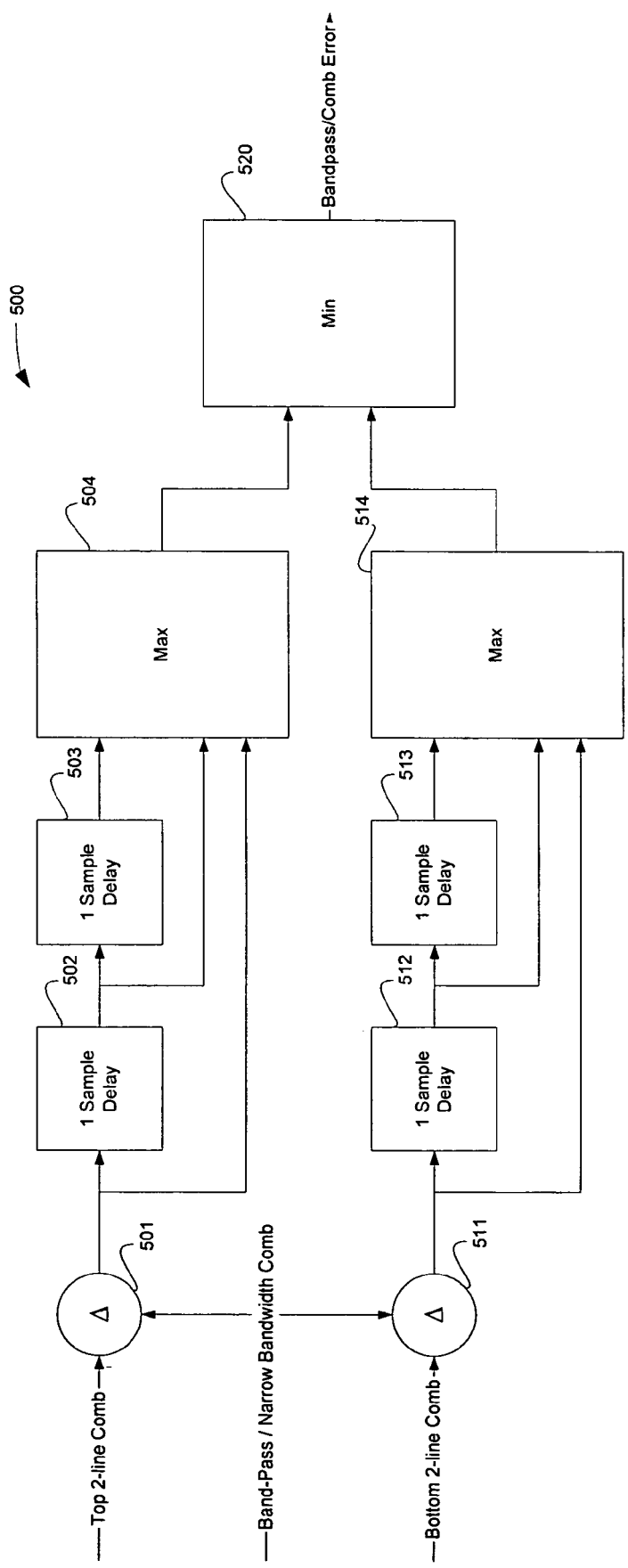
FIG. 5 is block diagram representing the band-pass filter match and comb filter match blocks of the Y/C separator in FIG. 3.
Figure 6:
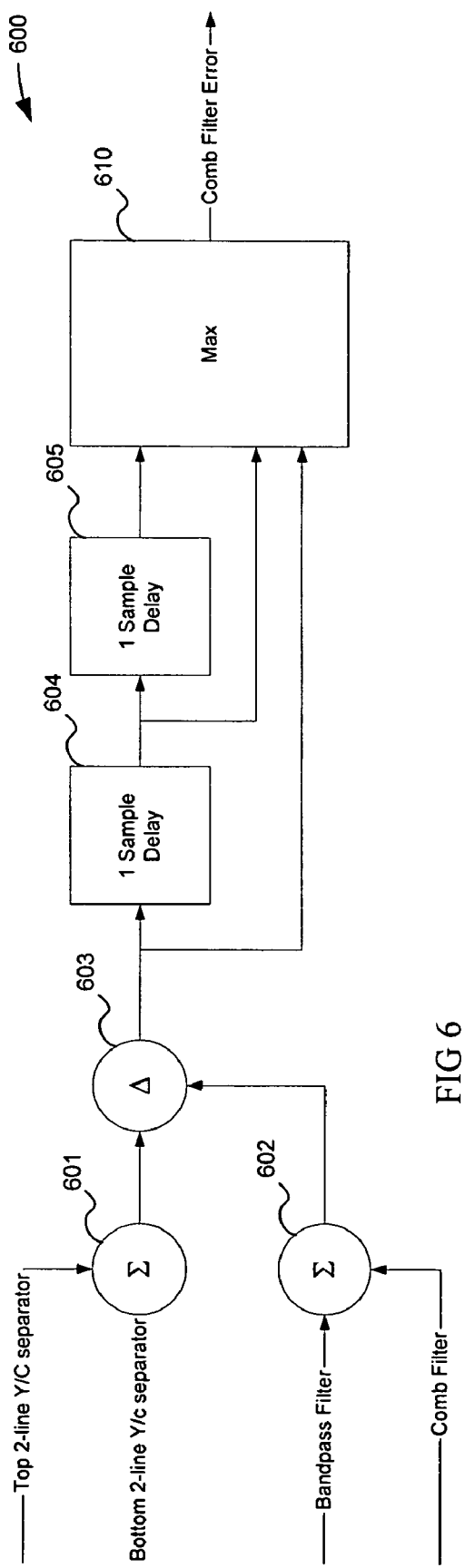
FIG. 6 is block diagram representing circuitry for summing two 2 line comb filters with the sum of a band-pass and comb filter output.

The details for blocks 307 and 308 are shown in FIG. 5. As discussed above, the first step is to take the difference between the two 2-line comb filters 302a and 302b and the band-pass 301 or 3-line comb filter 303 results at deltas 501 and 511. However, before finding the minimum difference between the two 2-line Y/C separators, 302a and 302b, and the band-pass filter 301, more robust results may be obtained by first filtering the differences using a maximum function 504 and 514, and then taking the minimum 520 of the two results. The same maximum/minimum function may be applied to the 3-line comb filter error measurement for PAL as shown in FIG. 6. For the PAL 3-line comb filter error measurement, only half the circuitry is used and the delta 603 is of the sum of the two 2-line comb filters 601 and the sum of the band-pass and comb filter outputs 602.

Figure 7:
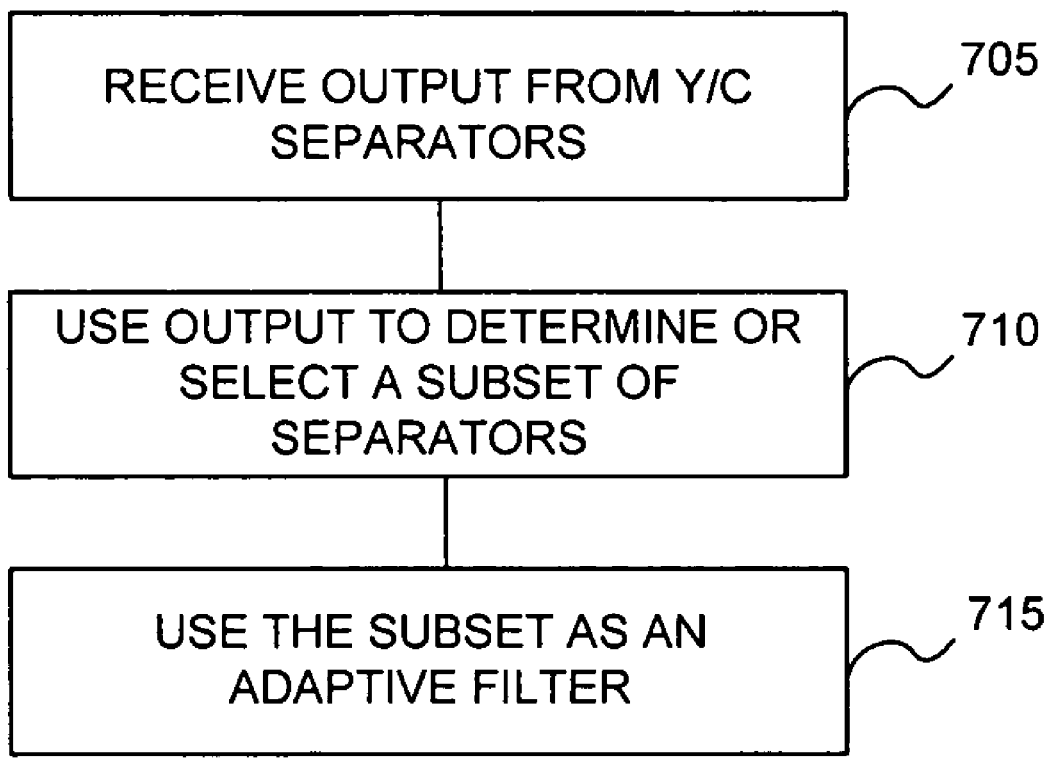
FIG. 7 is a flow diagram of an Y/C separator adaptive to characteristics of a video signal.

FIG. 7 is a flow diagram of a method of Y/C separation adaptive to features of a signal, as explained in detail above. An output signal from a plurality of filters is received at box 705. Features of the received signal are then used to determine or select a subset of the Y/C separators in box 710. In block 715 the subset is then used as an adaptive filter.

Referring back to the embodiment in FIG. 3, the diagonal edge detection block 305 may comprise the following filter:

$$\begin{bmatrix} +1, 0, 0, 0, 0, 0, 0, 0, & -1 \\ 0, 0, 0, 0, 0, 0, 0, 0, 0, & 0 \\ -1, 0, 0, 0, 0, 0, 0, 0, & +1 \end{bmatrix} * 1/4$$

The filter is essentially the change in slope over one period of the sub carrier. Because the change is done over one full period, the change effectively cancels out the sub carrier frequency for both PAL and NTSC video.

The present embodiment selects the two comb filters with the lowest error signal. A single value can represent the error signal, thus simplifying filter selection logic. The error signal for the narrowband comb filter may be the leakage found above as represented by blocks 306, 309 and 310. For the wideband comb filter, the error signal may then be the leakage plus a diagonal edge detector output. The chroma output can be a binary selection or some blending based on the size of the error signals.

In one embodiment, the blending is accomplished by using the difference in the error signals times a gain value to limit the difference in the comb/band pass filter. For example, to blend between the wide and narrow band comb filters, you would first compute the difference equal to the wide band comb filter minus the narrow band comb filter. You would then limit its value from zero by the amount of the narrowband comb filter error less the wideband comb filter error. If the resulting difference in the errors were less than zero, then the limit would be set to zero. The limited difference in the comb filter errors would then be added back to the narrowband comb filter resulting in a comb filter bandwidth that changes on a pixel-by-pixel basis. Even more sophisticated blending can be obtained by applying the concepts of fuzzy sets and fuzzy logic.

The selected error signal should reflect the relative mixture of the two comb filter inputs. As discussed above, better results can be obtained by increasing the narrowband comb filter error by adding a fraction of the wideband comb filter error 310 to narrow band comb filter leakage 309 in minimum comb filter leakage block 311. The added fraction helps because horizontal luma edges that tend to occur at the same location as horizontal chroma edges cause a large amount of leakage in the wideband comb filter. Biasing the error upwards helps to bias the band-pass vs. comb filter decision towards a band-pass filter and preserve the horizontal edge. In the present embodiment the output of block 312 is then added to the output of block 308 to produce the final comb filter error signal.

Although the invention has been described with reference to certain specific embodiments, various modifications thereof will be apparent to those skilled in the art without departing from the spirit and scope of the invention as outlined in the appended claims.

We claim:

1. An apparatus comprising:
a plurality of filters to separate luminance and chrominance data in a video signal; and
a selection circuit coupled with any of the plurality of filters to select a subset of the plurality of filters responsive to the video signal;
where the plurality of filters includes at least one narrow band comb filter and at least one wide band comb filter; and
where the selection circuit generates a comb selection error signal indicating how well at least one of the narrow band comb filter and the wide band comb filter fits the data.

2. The apparatus of claim 1
where the plurality of the filters includes at least one comb filter and at least one band pass filter; and
where the selection circuit indicates how well the at least one comb filter and the at least one band pass filter separates the luminance and chrominance data.

3. The apparatus of claim 2 where the selection circuit implements a blending operation.

4. The apparatus of claim 2 where the selection circuit implements a threshold decision algorithm.

5. The apparatus of claim 2 where the apparatus comprises a 3 line adaptive filter.

6. The apparatus of claim 1
where the plurality of filters includes an adaptive bandwidth comb filter.

7. An apparatus comprising:
a plurality of filters to separate luminance and chrominance data in a video signal; and
a selection circuit coupled with any of the plurality of filters to select a subset of the plurality of filters responsive to the video signal;
where the plurality of the filters includes at least one comb filter and at least one band pass filter;
where the selection circuit indicates how well the at least one comb filter and the at least one band pass filter separates the luminance and chrominance data; and
where the selection circuit selects one of a single line band pass filter, two 2 line comb filters, a 3 line comb filter, and a combination thereof.

8. An apparatus comprising:
a plurality of filters to separate luminance and chrominance data in a video signal; and
a selection circuit coupled with any of the plurality of filters to select a subset of the plurality of filters responsive to the video signal;
where the selection circuit implements a PAL modifier operation, the PAL modifier operation comprising a first order derivative function to implement a 90 degree phase shift in the chrominance channel based on whether a current pixel will generate a U or a V chrominance pixel after demodulation.

9. A method comprising:
receiving an output from a plurality of filters;
determining a subset of the filters responsive to the output;
using the subset as an adaptive filter to separate chroma and luma from a video signal;
providing at least one comb filter as one of the plurality of filters;
providing a band pass filter as at least another of the plurality of filters;
generating a first value to indicate how the band pass or comb filters fit luminance and chrominance data; and
using the first value to implement a threshold decision algorithm.

10. A method comprising:
receiving an output from a plurality of filters;
determining a subset of the filters responsive to the output;
using the subset as an adaptive filter to separate chroma and luma from a video signal;
providing at least one comb filter as one of the plurality of filters;
providing a top two line filter as at least another of the plurality of filters; and
providing a bottom two line filter as at least another of the plurality of filters.

11. A method comprising:
receiving an output from a plurality of filters;
determining a subset of the filters responsive to the output;
using the subset as an adaptive filter to separate chroma and luma from a video signal;
providing at least one comb filter as one of the plurality of filters;
providing a narrow band comb filter as at least another of the plurality of filters; and
providing a wide band comb filter as at least another of the plurality of filters.

12. The method of claim 11 further comprising using a second value to indicate how well the narrow or wide band comb filters fit luminance and chrominance data.

13. The method of claim 12 further comprising using the second value to implement a threshold decision algorithm.

14. A method comprising:
receiving an output from a plurality of filters;
determining a subset of the filters responsive to the output;
using the subset as an adaptive filter to separate chroma and luma from a video signal; and
providing at least one comb filter as one of the plurality of filters;
where determining the subset of the filters includes comparing a best fit between a 3 line comb filter and two 2 line comb filters.

15. The method of claim 14 comprising generating an indication of the subset of filters.

16. A method comprising:
receiving an output from a plurality of filters;
determining a subset of the filters responsive to the output;
using the subset as an adaptive filter to separate chroma and luma from a video signal;
providing at least one comb filter as one of the plurality of filters; and
implementing a 90 degree phase shift in chrominance data responsive to determining whether a current pixel will generate a U or a V chrominance pixel after demodulation.

17. An apparatus, comprising:
a band pass filter to filter a first delayed signal;
a top line filter to filter the first delayed signal and the second delayed signal;
a bottom line filter to filter a composite signal and the second delayed signal;

a narrow band comb filter to filter the composite, first, and second delayed signals;

a wide band comb filter to filter the composite, first, and second delayed signals;

a selection circuit to select at least one of the band pass, top line, bottom line, narrow band, and wide band filters responsive to at least one error signal.

18. The apparatus of claim 17 where the selection circuit comprises:

a band pass filter leakage circuit to filter a signal output from the band pass filter;

a narrow band comb filter leakage circuit to filter a signal output from the narrow band filter; and a wide band comb filter leakage circuit to filter a signal output from the wide band filter.

19. The apparatus of claim 17 where the selection circuit comprises:

a band pass match filter to filter a signal output from the band pass filter, top line filter, and bottom line filter; and a comb match filter to filter a signal output from the narrow band filter, top line filter, and bottom line filter.

20. The apparatus of claim 17 where the selection circuit generates a band pass error signal and a comb selection error signal.

21. The apparatus of claim 17 comprising a diagonal edge detector to detect a diagonal edge between the composite and second delayed signals.

* * * * *